(12) United States Patent
Tang et al.

(10) Patent No.: US 9,231,913 B1
(45) Date of Patent: Jan. 5, 2016

(54) TECHNIQUES FOR SECURE BROWSING

(71) Applicant: Symantec Corporation, Mountain View, CA (US)

(72) Inventors: Xiaochuan Tang, Sichuan (CN); Jinfu Chen, Sichuan (CN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/189,372

(22) Filed: Feb. 25, 2014

(51) Int. Cl.
*H04L 29/06* (2006.01)

(52) U.S. Cl.
CPC .................................. *H04L 63/0227* (2013.01)

(58) Field of Classification Search
CPC ................................................. H04L 63/0227
USPC .......................................................... 726/13
See application file for complete search history.

(56) References Cited

U.S. PATENT DOCUMENTS

| | | | |
|---|---|---|---|
| 7,007,080 B2 * | 2/2006 | Wilson ........................... | 709/221 |
| 8,566,919 B2 * | 10/2013 | Meisel ............................ | 726/13 |
| 2001/0034842 A1 * | 10/2001 | Chacko et al. ................. | 713/201 |
| 2003/0033517 A1 * | 2/2003 | Rutherglen et al. ........... | 713/153 |
| 2005/0033985 A1 * | 2/2005 | Xu et al. ........................ | 713/201 |
| 2005/0043999 A1 * | 2/2005 | Ji et al. ........................... | 705/21 |
| 2005/0120242 A1 * | 6/2005 | Mayer et al. ................... | 713/201 |
| 2006/0059550 A1 * | 3/2006 | Kausik ............................ | 726/11 |
| 2006/0064469 A1 * | 3/2006 | Balasubrahmaniyan et al. .............................. | 709/218 |
| 2007/0022286 A1 * | 1/2007 | Makni ........................... | 713/163 |
| 2008/0047007 A1 * | 2/2008 | Satkunanathan et al. ....... | 726/22 |
| 2009/0327551 A1 * | 12/2009 | Ziegler .......................... | 710/260 |
| 2010/0036779 A1 * | 2/2010 | Sadeh-Koniecpol et al. ... | 706/11 |
| 2011/0252462 A1 * | 10/2011 | Bonanno et al. ................. | 726/7 |
| 2012/0324568 A1 * | 12/2012 | Wyatt et al. ..................... | 726/13 |
| 2013/0205361 A1 * | 8/2013 | Narayanaswamy et al. ...... | 726/1 |
| 2014/0041012 A1 * | 2/2014 | Yeow et al. ..................... | 726/11 |

* cited by examiner

*Primary Examiner* — Michael S McNally
(74) *Attorney, Agent, or Firm* — Wilmer Cutler Pickering Hale and Dorr LLP

(57) ABSTRACT

Techniques for secure browsing may be realized as a method including: in response to a non-browser instruction to resolve a first resource reference, submitting the first resource reference to a server; receiving a response from the server indicating approval of the first resource reference; directing the first resource reference to a browser application based on the approval response; in response to a non-browser instruction to resolve a second resource reference, submitting the second resource reference to the server; receiving a response from the server indicating disapproval of the second resource reference; and determining not to direct the second resource reference to a browser application based on the disapproval response.

20 Claims, 4 Drawing Sheets

TECHNIQUES FOR SECURE BROWSING

FIELD OF THE DISCLOSURE

The present disclosure relates generally to browsing networks and, more particularly, to techniques for secure browsing.

BACKGROUND OF THE DISCLOSURE

Internet browsing has increasingly become a standard part of the use of mobile computing devices, and correspondingly uniform resource locator (URL) addresses are often provided to a mobile device in many different ways, from short message service (SMS) messages to links within mobile applications. Furthermore, mobile devices may have a variety of applications available for browsing. Because there are multiple vectors available both for receiving and entering web addresses, safeguards limited to specific vectors may still allow attacks from bad URLs received and entered through unprotected vectors. Indeed, there is currently a lack of capability to examine and clear a URL on a mobile device irrespective of its source or the eventual browser selected to display it.

In view of the foregoing, it may be understood that there may be significant problems and shortcomings associated with current URL firewall technologies.

SUMMARY OF THE DISCLOSURE

Techniques for secure browsing are disclosed. In one particular embodiment, the techniques may be realized as a method comprising the steps of, in response to a non-browser instruction to resolve a first resource reference, submitting the first resource reference to a server; receiving a response from the server indicating approval of the first resource reference; directing the first resource reference to a browser application based on the approval response; in response to a non-browser instruction to resolve a second resource reference, submitting the second resource reference to the server; receiving a response from the server indicating disapproval of the second resource reference; and determining not to direct the second resource reference to a browser application based on the disapproval response.

In accordance with other aspects of this particular embodiment, the method may further comprise generating a notification associated with the second resource reference based on the disapproval response.

In accordance with other aspects of this particular embodiment, the method may further comprise, after determining not to direct the second resource reference to a browser application based on the disapproval response, receiving override input from a user to resolve the second resource reference; and directing the second resource reference to a browser application based on the override input.

In accordance with other aspects of this particular embodiment, the method may further comprise, in response to receiving approval of the first resource reference, presenting a plurality of browser applications for selection by a user. Directing the first resource reference to a browser application may be further based on a selection made by the user In accordance with other aspects of this particular embodiment, the method may further comprise, before the non-browser instruction to resolve the first resource reference, receiving a selection of a default browser application. The browser application that the first resource reference is directed to may be the default browser application In accordance with other aspects of this particular embodiment, submitting the first resource reference to a server may occur in response to a user selecting a firewall application from a browser list for resolving the first resource reference In accordance with other aspects of this particular embodiment, wherein submitting the first resource reference to a server may occur based on a firewall application having previously been chosen as a default application for resolving resource references In accordance with another exemplary embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another exemplary embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
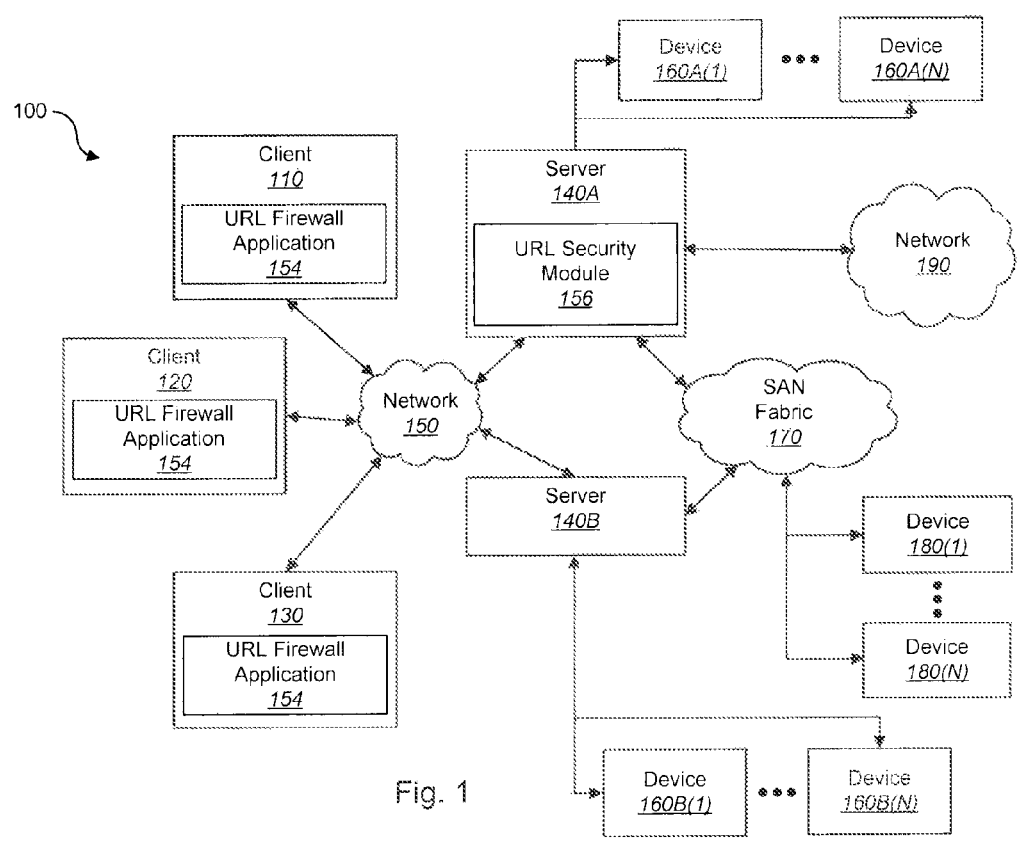
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
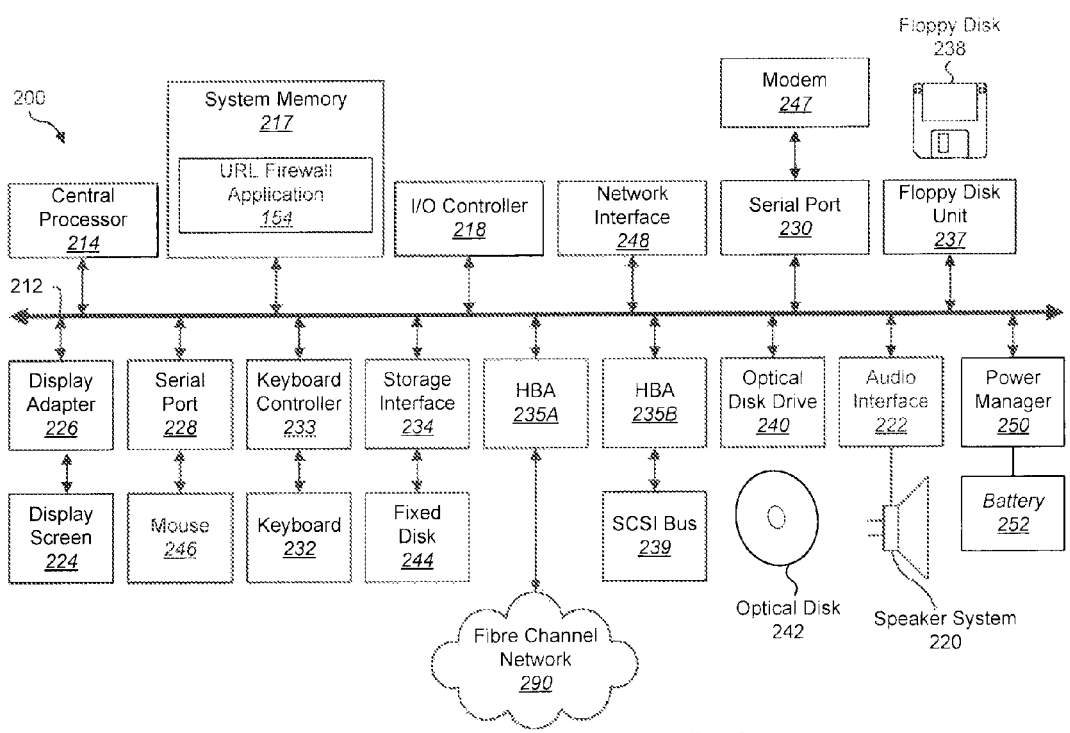
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for implementation of secure browsing processes such as, for example, URL firewall application 154, while server 140A may include one or more portions such as, for example, URL security module 156. Further, one or more portions of the URL security module 156 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including URL security module 154 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, URL firewall application 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
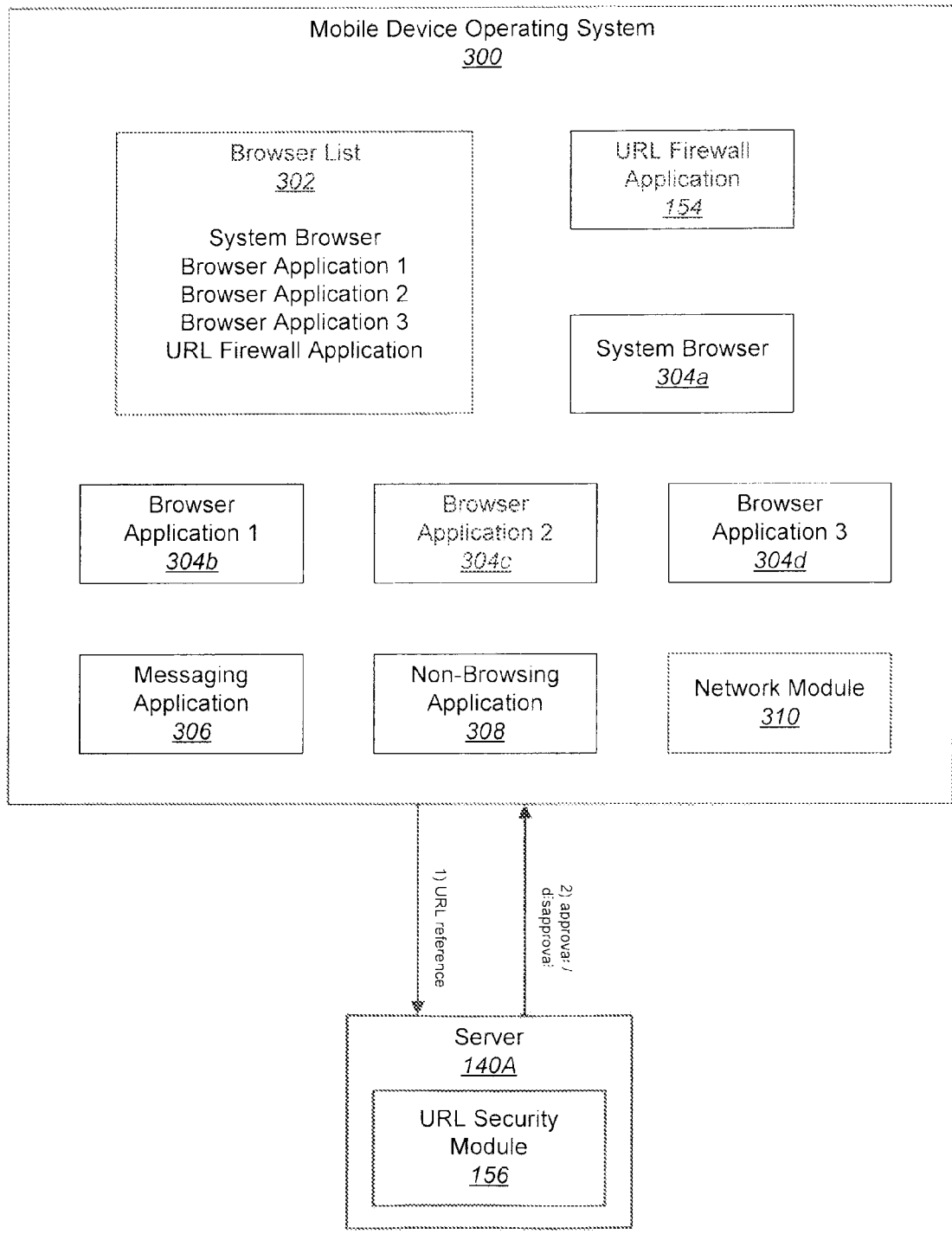
FIG. 3 shows a block diagram of a mobile device operating system and security server in accordance with an embodiment of the present disclosure.

In one embodiment, a client system 110 may be a mobile device which includes an operating system 300 as illustrated in FIG. 3. Here, the operating system 300 maintains a browser list 302 which indicates which applications are equipped to receive resource references such as URLS as inputs. In some implementations, even though the URL firewall application 154 is not equipped as a browser to resolve resource references, the URL firewall application 154 is nonetheless configured to appear on the browser list 302 so that it can respond to a resource reference being selected for resolution. A default system browser 304a and additional installed browser applications 304b-d are also included on the browser list.

In addition to the URL firewall application 154 and browser applications 304a-d, the system may also include a messaging application 306, which may be an SMS or MMS application, an instant messaging application, or the like. One or more other non-browsing applications 308 may also be installed; common examples include email, mapping, shopping, account management, and others. Some non-browsing applications may present information received from the Internet in a unique format, but under some other circumstances may present a resource reference such as a URL for resolution by the mobile device outside of the application.

The device may also include a network module 310, which is equipped to access a network such as the Internet in order to send and receive information not available on the mobile device itself. The operating system 300 may allow any of the browsing and/or non-browsing applications to interface with the network module 310 in order to send and receive information over the internet as necessary.

The messaging application 306 or another non-browsing application 308 may present a user with a resource reference, such as a URL, that the user may select in order to browse to a resource. The operating system 300 is then configured to allow a user to select any of the browsers on the browser list 302 to resolve the reference and access the resource. This poses a security challenge, as firewalls or other security installed, for example, on the system browser 304a may not also be installed on the other browser applications 304b-d. This avenue of accessing websites therefore represents a potential security risk.

The risk can be addressed by the user selecting the URL firewall application to resolve the reference. The URL firewall application 154 transmits the reference to a server 140A including a URL security module 156, which is equipped to evaluate the reference. An approval or disapproval is then returned to the URL firewall application 154, which may convey each approved reference onto a browser application 304a-d. Unapproved references may instead be flagged for further scrutiny by the system and/or user, and not passed along to a browser.

Figure 4:
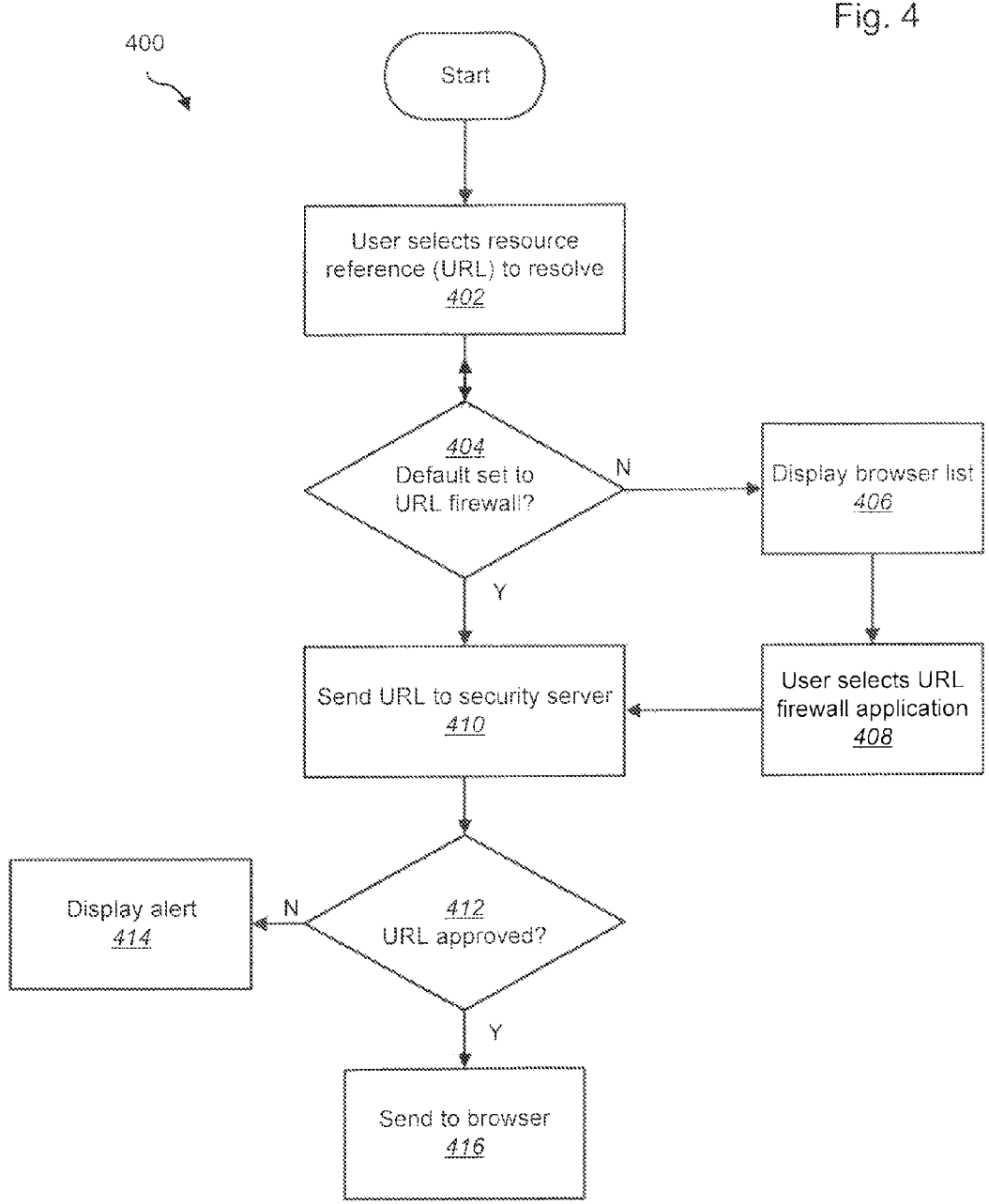
FIG. 4 shows a method for secure browsing in accordance with an embodiment of the present disclosure.

FIG. 4 illustrates a method 400 for secure browsing on a mobile device. Although the example discussed with respect to method 400 is a URL, one of ordinary skill will recognize that any reference to a remote resource may be treated similarly regardless of the particular protocol associated with the reference.

The user selects a resource reference to resolve (402). As discussed above, the resource reference may have been provided to the user by means of a non-browser application, so that the mobile device has to select an appropriate application to resolve the reference.

The system then checks to see if the URL firewall application is set as the default application (404). In some implementations, the method 400 will proceed if the default is not set at all or is set to the URL firewall application. If another default browser is already set to resolve the resource reference, then there may not be an opportunity for the URL firewall to intervene; therefore, it is important that the URL firewall application be either set as the default application for resolving URLs or available for selection by the user.

If the URL browser is not set as the default, then the system displays a browser list from which the user may select a browser (406). The user selects the URL firewall application in order to proceed with the secure browsing process (408).

Once the URL firewall application is activated to resolve the URL, it transmits the URL to a remote security server capable of evaluating the URL (410). In some implementations, this transmission may occur over the same network connection that the application would use if it were browsing to the selected site, so that as long as the URL firewall application has the permissions for a browser it should be able to communicate with the security server as necessary.

The security server sends back whether the URL is approved (412). If the URL is not approved, then the URL firewall application may alert the user that a risky URL has been selected for browsing (414). In some implementations, the application may then allow the user to decide whether to proceed with resolving the risky URL or not. The source of the risky URL (for example, the non-browser application, or the identity of the messenger if received in a message) may also be logged for further analysis or flagged by the system for additional scrutiny. In some implementations, the system may provide the option of disabling certain capabilities (such as removing the hotlinks from a questionable application or particular messenger) based on the disapproved URL.

If the URL is approved, then the firewall application may send the URL on to be resolved by a browser application as normal (416). In some implementations, the firewall application may provide the user with the system's browser list, minus its own entry. The user may also be able to configure a default browser to which the URL firewall application automatically directs approved URLs.

At this point it should be noted that techniques for secure browsing in accordance with the present disclosure as described above may involve the processing of input data and the generation of output data to some extent. This input data processing and output data generation may be implemented in hardware or software. For example, specific electronic components may be employed in a URL firewall application, URL security module, security server, or similar or related circuitry for implementing the functions associated with secure browsing in accordance with the present disclosure as described above. Alternatively, one or more processors operating in accordance with instructions may implement the functions associated with secure browsing in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
   in response to a non-browser instruction on a mobile device to resolve a first resource reference, sending the first resource reference to a non-browser firewall application installed on the mobile device, wherein the non-browser firewall application is designated on the mobile device as a browser application;
   submitting, by the non-browser firewall application, the first resource reference to a server;
   receiving, by the non-browser firewall application, a response from the server indicating approval of the first resource reference;
   directing, by the non-browser firewall application, the first resource reference to a browser application based on the approval response;
   in response to a non-browser instruction on the mobile device to resolve a second resource reference, sending the second resource reference to the non-browser firewall application;
   submitting, by the non-browser firewall application, the second resource reference to the server;
   receiving, by the non-browser firewall application, a response from the server indicating disapproval of the second resource reference; and
   determining, by the non-browser firewall application, not to direct the second resource reference to a browser application based on the disapproval response.

2. The method of claim 1, further comprising generating a notification associated with the second resource reference based on the disapproval response.

3. The method of claim 1, further comprising:
   after determining not to direct the second resource reference to a browser application based on the disapproval response, receiving override input from a user to resolve the second resource reference; and
   directing the second resource reference to a browser application based on the override input.

4. The method of claim 1, further comprising:
   in response to receiving approval of the first resource reference, the mobile device presenting a plurality of browser applications installed on the mobile device for selection by a user;
   wherein directing the first resource reference to a browser application is further based on a selection made by the user.

5. The method of claim 1, further comprising:
   before the non-browser instruction to resolve the first resource reference, receiving a selection of a default browser application;
   wherein the browser application that the first resource reference is directed to is the default browser application.

6. The method of claim 1, wherein submitting the first resource reference to a server occurs in response to a user selecting the non-browser firewall application from a browser list presented by the mobile device for resolving the first resource reference.

7. The method of claim 1, wherein submitting the first resource reference to a server occurs based on the non-browser firewall application having previously been chosen as a default application for resolving resource references on the mobile device.

8. The method of claim 1, wherein the mobile device includes at least one non-transitory processor readable storage medium storing a computer program of instructions configured to be readable by at least one processor for instructing the at least one processor to execute a computer process for performing the method as recited in claim 1.

9. An article of manufacture comprising:
   at least one non-transitory processor readable storage medium; and
   instructions stored on the at least one medium;
   wherein the instructions are configured to be readable from the at least one medium by at least one processor and thereby cause the at least one processor to operate so as to:
      register and list a non-browser firewall application on the article as a browser application;
      in response to a non-browser instruction to resolve a first resource reference, sending the first resource reference to the non-browser firewall application;
      submit, by the non-browser firewall application, the first resource reference to a server;
      receive, by the non-browser firewall application, a response from the server indicating approval of the first resource reference;

direct, by the non-browser firewall application, the first resource reference to a browser application based on the approval response;

in response to a non-browser instruction to resolve a second resource reference, send the second resource reference to the non-browser firewall application;

submit, by the non-browser firewall application, the second resource reference to the server;

receive, by the non-browser firewall application, a response from the server indicating disapproval of the second resource reference; and determine, by the non-browser firewall application, not to direct the second resource reference to a browser application based on the disapproval response.

10. The article of claim 9, the at least one processor further operable to generate a notification associated with the second resource reference based on the disapproval response.

11. The article of claim 9, the at least one processor further operable to:

after determining not to direct the second resource reference to a browser application based on the disapproval response, receive override input from a user to resolve the second resource reference; and direct the second resource reference to a browser application based on the override input.

12. The article of claim 9, the at least one processor further operable to:

in response to receiving approval of the first resource reference, present a plurality of applications registered and listed on the article as browser applications for selection by a user;

wherein directing the first resource reference to a browser application is further based on a selection made by the user.

13. The article of claim 9, the at least one processor further operable to:

before the non-browser instruction to resolve the first resource reference, receive a selection of a default browser application;

wherein the browser application that the first resource reference is directed to is the default browser application.

14. The article of claim 9, wherein submitting the first resource reference to a server occurs in response to a user selecting the non-browser firewall application from a browser list presented by the article for resolving the first resource reference.

15. The article of claim 9, wherein submitting the first resource reference to a server occurs based on the non-browser firewall application having previously been chosen as a default application on the article for resolving resource references.

16. A mobile device comprising:

one or more processors communicatively coupled to a network; wherein the one or more processors are configured to:

in response to a non-browser instruction on the mobile device to resolve a first resource reference, send the first resource reference to a non-browser firewall application installed on the mobile device, wherein the non-browser firewall application is designated on the mobile device as a browser application;

submit, by the non-browser firewall application, the first resource reference to a server;

receive, by the non-browser firewall application, a response from the server indicating approval of the first resource reference;

direct, by the non-browser firewall application, the first resource reference to a browser application based on the approval response;

in response to a non-browser instruction to resolve a second resource reference, send the second resource reference to the non-browser firewall application;

submit, by the non-browser firewall application, the second resource reference to the server;

receive, by the non-browser firewall application, a response from the server indicating disapproval of the second resource reference; and determine, by the non-browser firewall application, not to direct the second resource reference to a browser application based on the disapproval response.

17. The mobile device of claim 16, the one or more processors further configured to generate a notification associated with the second resource reference based on the disapproval response.

18. The mobile device of claim 16, the one or more processors further configured to:

after determining not to direct the second resource reference to a browser application based on the disapproval response, receive override input from a user to resolve the second resource reference; and direct the second resource reference to a browser application based on the override input.

19. The mobile device of claim 16, the one or more processors further configured to:

in response to receiving approval of the first resource reference, present a plurality of browser applications for selection by a user;

wherein directing the first resource reference to a browser application is further based on a selection made by the user.

20. The mobile device of claim 16, the one or more processors further configured to:

before the non-browser instruction to resolve the first resource reference, receive a selection of a default browser application;

wherein the browser application that the first resource reference is directed to is the default browser application.

* * * * *